(12) United States Patent
Jun

(10) Patent No.: US 11,750,904 B2
(45) Date of Patent: Sep. 5, 2023

(54) CAMERA MODULE AND PORTABLE TERMINAL INCLUDING CAMERA MODULE

(71) Applicant: SAMSUNG ELECTRO-MECHANICS CO., LTD., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/177,280

(22) Filed: Feb. 17, 2021

(65) Prior Publication Data
US 2022/0030142 A1 Jan. 27, 2022

(30) Foreign Application Priority Data
Jul. 24, 2020 (KR) .................... 10-2020-0092208

(51) Int. Cl.
*H04N 23/55* (2023.01)
*G02B 9/60* (2006.01)
*G02B 13/00* (2006.01)
*H04N 23/51* (2023.01)

(52) U.S. Cl.
CPC .............. *H04N 23/55* (2023.01); *G02B 9/60* (2013.01); *G02B 13/0045* (2013.01); *H04N 23/51* (2023.01)

(58) Field of Classification Search
CPC ............ G02B 13/0045; G02B 13/0065; G02B 26/0816; G02B 9/60; H04N 5/2252; H04N 5/2254; H04N 5/2257
See application file for complete search history.

(56) References Cited

U.S. PATENT DOCUMENTS

| 10,110,878 | B2 * | 10/2018 | Hsu .................. H04N 23/57 |
| 11,070,731 | B2 * | 7/2021 | Wippermann ....... H04N 23/685 |
| 11,375,092 | B2 * | 6/2022 | Kang .................. H04N 23/55 |
| 2011/0019072 | A1 | 1/2011 | Yen et al. |
| 2014/0111650 | A1 * | 4/2014 | Georgiev ............ H04N 23/698 348/159 |
| 2016/0299349 | A1 | 10/2016 | Cho |
| 2017/0272650 | A1 | 9/2017 | Lee et al. |

(Continued)

FOREIGN PATENT DOCUMENTS

| CN | 2703267 Y | 6/2005 |
| CN | 101963741 A | 2/2011 |

(Continued)

OTHER PUBLICATIONS

Korean Office Action dated Apr. 27, 2021 in counterpart Korean Patent Application No. 10-2020-0092208 (6 pages in English) (4 pages in Korean).

(Continued)

*Primary Examiner* — Amy R Hsu
(74) *Attorney, Agent, or Firm* — NSIP Law

(57) ABSTRACT

A camera module includes a first lens module defining a first optical axis; a second lens module defining a second optical axis; and a first optical path changing unit disposed between the first lens module and the second lens module and configured to selectively reflect or refract light incident along a third optical axis intersecting the first and second optical axes to the first lens module or the second module.

20 Claims, 13 Drawing Sheets

(56) References Cited

U.S. PATENT DOCUMENTS

| | | | |
|---|---|---|---|
| 2017/0285307 A1 | 10/2017 | Kamm et al. | |
| 2018/0091795 A1* | 3/2018 | Hsu | H04N 13/296 |
| 2020/0057313 A1* | 2/2020 | Lee | G03B 17/17 |
| 2021/0048605 A1* | 2/2021 | Lim | G02B 13/0065 |
| 2021/0136261 A1* | 5/2021 | Lee | G03B 30/00 |
| 2021/0294092 A1* | 9/2021 | Smirnov | G02B 26/08 |
| 2021/0364728 A1* | 11/2021 | Li | G03B 17/17 |
| 2021/0377448 A1* | 12/2021 | Seo | H04N 23/51 |

FOREIGN PATENT DOCUMENTS

| | | |
|---|---|---|
| CN | 103246134 A | 8/2013 |
| CN | 107219710 A | 9/2017 |
| CN | 109068029 A | 12/2018 |
| CN | 210401979 U | 4/2020 |
| JP | 2000-261723 A | 9/2000 |
| JP | 2013-179450 A | 9/2013 |
| JP | 2017-060107 A | 3/2017 |
| JP | 2017-187771 A | 10/2017 |
| KR | 10-0675215 B1 | 1/2007 |
| KR | 20-2009-0003573 U | 4/2009 |
| KR | 10-2016-0121298 A | 10/2016 |

OTHER PUBLICATIONS

Chinese Office Action dated Dec. 12, 2022, in counterpart Chinese Patent Application No. 202110756845.3 (9 Pages in Chinese, 6 Pages in English).

* cited by examiner

II-II'

CAMERA MODULE AND PORTABLE TERMINAL INCLUDING CAMERA MODULE

CROSS-REFERENCE TO RELATED APPLICATION(S)

This application claims the benefit under 35 USC 119(a) of Korean Patent Application No. 10-2020-0092208 filed on Jul. 24, 2020 in the Korean Intellectual Property Office, the entire disclosure of which is incorporated herein by reference for all purposes.

BACKGROUND

1. Field

The following description relates to a camera module configured to capture images of subjects located to a front and a rear and a portable terminal having the same.

2. Description of Background

A camera module may be mounted in a portable terminal. For example, a camera module may be disposed on a front surface or a rear surface of the portable terminal to capture an image of a subject located to the front or the rear of the portable terminal. As the camera module is configured to only image a subject located on one side of the portable terminal, a plurality of camera modules is required to respectively capture images to the front and rear of the portable terminal. In addition, since the camera module has only one focal length, a lens module or a camera module having different characteristics is required for high-quality imaging. Due to a small internal space of the portable terminal, however, it may be difficult to provide a plurality of camera modules.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

A camera module configured to selectively capture images of subjects located to a front and a rear through different optical performances, and a portable terminal including the same.

In one general aspect, a camera module includes a first lens module defining a first optical axis; a second lens module defining a second optical axis; and a first optical path changing unit disposed between the first lens module and the second lens module and configured to selectively reflect or refract light incident along a third optical axis intersecting the first and second optical axes to the first lens module or the second module.

The first lens module and the second lens module may have different optical characteristics.

The first optical axis and the second optical axis may be collinear.

The first optical path changing unit may be disposed between a distal end of the first lens module and a distal end of the second lens module.

The camera module may include a first image sensor in which an image of light incident through the first lens module is formed; and a second image sensor in which an image of light incident through the second lens module is formed.

A distance between a distal end of the first lens module and the first image sensor may be different from a distance between a distal end of the second lens module and the second image sensor.

The camera module may include a second optical path changing unit disposed between the first lens module and the first image sensor.

The camera module may include third optical path changing unit disposed between the second lens module and the second image sensor.

The first optical path changing unit may include a movable member configured to rotate with respect to a point in which the first optical axis and the third optical axis intersect; a first optical path changing member disposed on a first surface of the movable member; and a second optical path changing member disposed on a second surface of the movable member.

The camera module may include a driving mechanism configured to drive the first optical path changing unit.

The camera module may include a housing accommodating the first lens module, the second lens module, and the first optical path changing unit, and the housing may define an incident window through which the light incident along the third optical axis passes.

The camera module may include a buffer mechanism disposed in the housing and configured to prevent a collision between the first optical path changing unit and the first and second lens modules.

The buffer mechanism may include: a support member disposed in the housing; and an elastically deformable buffer member disposed in the support member.

The camera module may include a driving mechanism configured to move the first lens module along the first optical axis.

The driving mechanism may include a driving magnet disposed in the first lens module; and a driving coil disposed in the housing.

The camera module may be disposed in a portable terminal.

In another general aspect, a camera module includes a first lens module including one or more lenses aligned along a first optical axis; a second lens module including one or more lenses aligned along a second optical axis that is parallel to the first optical axis; and an optical path changing mechanism disposed between the first lens module and the second lens module and configured to simultaneously and selectively reflect or refract light incident from a first direction that intersects the first and second optical axes and light incident from a second direction that intersects the first and second optical axes and is different from the first direction to the first lens module and the second module.

The camera module of claim 17, wherein the optical path changing mechanism is configured to move between a first position in which the light incident from the first direction is reflected or refracted toward the first lens module along the first optical axis and the light incident from the second direction is reflected or refracted toward the second lens module along the second optical axis, and a second position in which the light incident from the first direction is reflected or refracted toward the second lens module along the second optical axis and the light incident from the second direction is reflected or refracted toward the first lens module along the first optical axis.

The camera module of claim 18, further comprising a driving mechanism configured to rotate optical path changing mechanism between the first position and the second position with respect to a point at which either the first optical axis or the second optical axis intersects one of an axis corresponding to the first direction and an axis corresponding to the second direction.

The camera module of claim 17, where the first lens module has a narrower angle of view than the second lens module.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
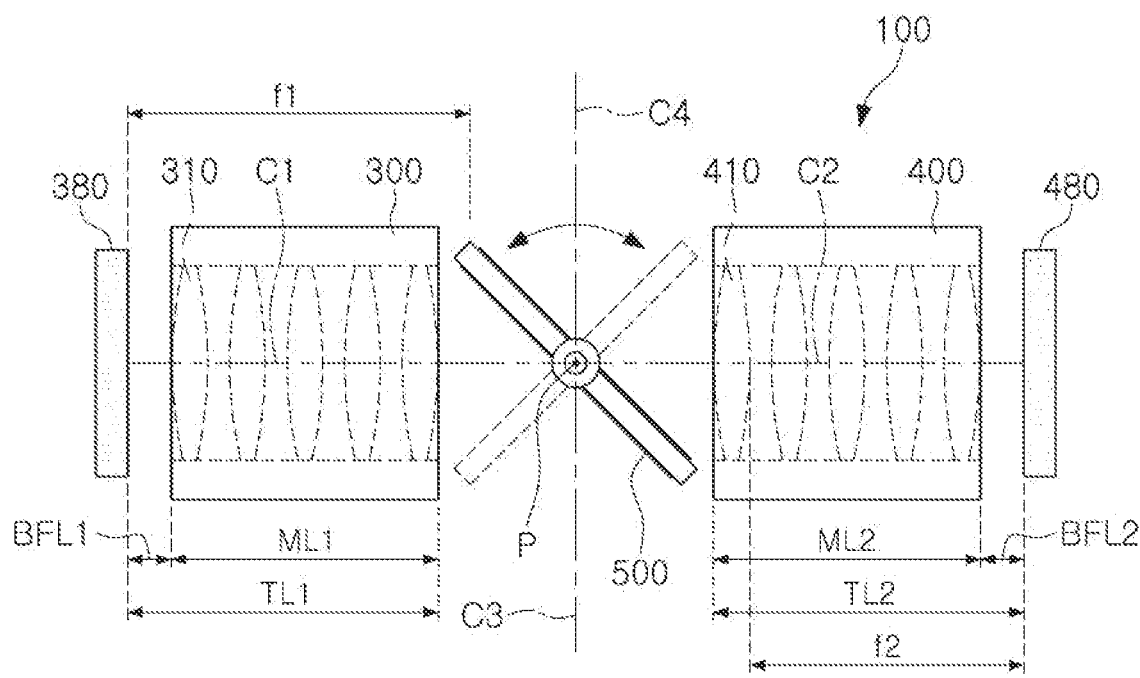
FIG. 1 is a diagram illustrating a configuration of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

The camera module described in the various examples may be mounted on a portable electronic product. For example, the camera module may be mounted on a portable telephone, a laptop, or the like. However, a usage range of the camera module according to the examples is not limited thereto. For example, the camera module may be any electronic device in which a camera module can be installed in front and rear surfaces thereof.

A camera module according to an example will be described with reference to FIG. 1.

A camera module 100 may include a plurality of lens modules 300 and 400, a plurality of image sensors 380 and 480, and an optical path changing unit 500. However, a configuration of the camera module 100 is not limited thereto.

The lens modules 300 and 400 may be configured to form an image of a subject in the image sensors 380 and 480. For example, a first lens module 300 is configured to form an image of light incident on the first image sensor 380, and a second lens module 400 is configured to form an image of light incident on the second image sensor 480. The lens modules 300 and 400 may include one or more lenses 310 and 410. For example, the first lens module 300 may include one or more first lenses 310, and the second lens module 400 may include one or more second lenses 410. The lenses 310 and 410 may be sequentially disposed along optical axes C1 and C2 of the lens modules 300 and 400. For example, the first lens(es) 310 may be sequentially disposed along the first optical axis C1 of the first lens module 300, while the second lens(es) 410 may be sequentially disposed along the second optical axis C2 of the second lens module 400. The first lens module 300 and the second lens module 400 may have different focal lengths. For example, a focal length f1 of the first lens module 300 may be greater than a focal length f2 of the second lens module 400. The first lens module 300 and the second lens module 400 may be disposed substantially in parallel. For example, the first optical axis C1 of the first lens module 300 and the second optical axis C2 of the second lens module 400 may be substantially parallel and/or collinear. The first optical axis C1 and the second optical axis C2 may be connected to each other. For example, the first optical axis C1 and the second optical axis C2 may lie on a same line.

The first lens module 300 and the second lens module 400 may be configured to have different optical characteristics. For example, refractive power distribution of the first lenses 310 configuring the first lens module 300 may be different from that of the second lenses 410 configuring the second lens module 400. A number of the first lenses 310 configuring the first lens module 300 may be different from a number of the second lenses 410 configuring the second lens module 400. A length ML1 of the first lens module 300 along the first optical axis C1 may be different from a length ML2 of the second lens module 400 along the second optical axis C2. A distance TL1 from a distal end of the first lens module 300 to the first image sensor 380 may be different from a distance TL2 from a distal end of the second lens module 400 to the second image sensor 480. A distance BFL1 from an end of the first lens module 300 to the first image sensor 380 may be different from a distance BFL2 from an end of the second lens module 400 to the second image sensor 480.

The first lens module 300 may be configured to capture an image of a subject located at long distance, and the second lens module 400 may be configured to capture an image of a subject located at short distance. The first lens module 300 may be configured to have a narrow angle of view, while the second lens module 400 may be configured to have a wide angle of view.

The image sensors 380 and 480 are configured to convert optical signals refracted by the lens modules 300 and 400 into electric signals. For example, the first image sensor 380 converts an optical signal incident through the first lens module 300 into an electric signal, and the second image sensor 480 converts an optical signal incident through the second lens module 400 into an electric signal. The image sensors 380 and 480 may be manufactured in the form of a charge-coupled device (CCD). One surface of each of the image sensors 380 and 480 may form imaging plane on which an image of light refracted by the lens modules 300 and 400 is formed.

The optical path changing unit 500 may be disposed between the first lens module 300 and the second lens module 400. For example, the optical path changing unit 500 may be disposed between a distal end of the first lens module 300 and that of the second lens module 400. The optical path changing unit 500 may be configured to convert a path of light incident on the camera module 100. For example, the optical path changing unit 500 may reflect or refract light incident from a direction intersecting the first optical axis C1 and the second optical axis C2 to the first lens module 300 or the second lens module 400. The optical path changing unit 500 may be configured to form two optical paths. As an example, the optical path changing unit 500 reflects or refracts light incident along a third optical axis C3 in the direction of the first optical axis C1 and reflects or refracts light incident along a fourth optical axis C4 in the direction of the optical axis C2. As another example, the optical path changing unit 500 reflects or refracts light incident along the third optical axis C3 in the direction of the second optical axis C2 and reflects or refracts the light incident along the fourth optical axis C4 in the direction of the optical axis C1. The optical path changing unit 500 may be configured to be rotatable. For example, the optical path changing unit 500 may rotate with respect to a point P at which the first optical axis C1 and the third optical axis C3 intersect or a point P at which the second optical axis C2 and the fourth optical axis C4 intersect.

Figure 2:
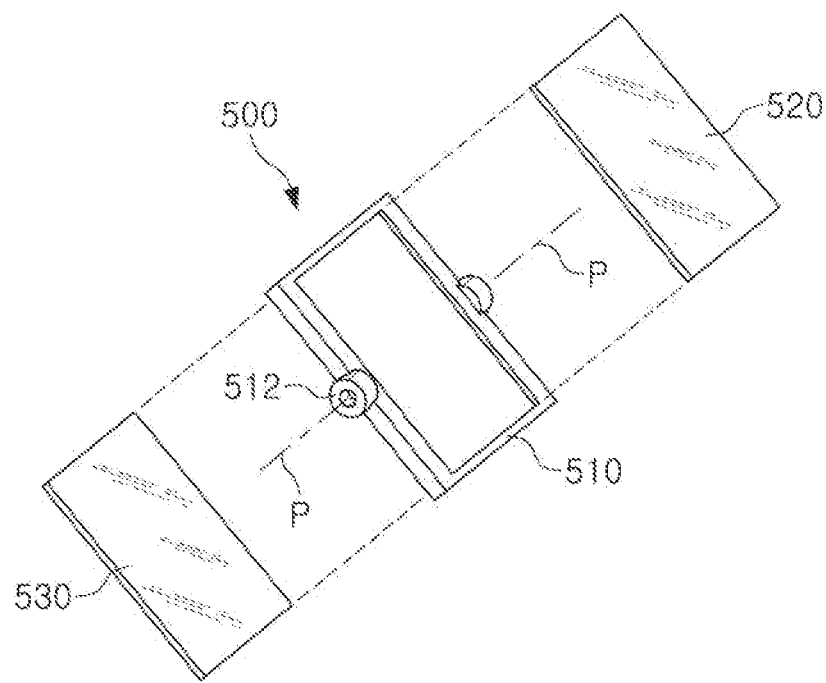
FIG. 2 is a diagram illustrating a configuration of an optical path changing unit illustrated in FIG. 1.

A configuration of the optical path changing unit will be described with reference to FIG. 2.

The optical path changing unit 500 may include a movable member 510, a first optical path changing member 520 and a second optical path changing member 530. However, a configuration of the optical path changing unit 500 is not limited thereto. The movable member 510 is configured to be rotatable. For example, the movable member 510 may rotate with respect to a fixed shaft 512. The fixed shaft 512 may be connected to a separate driving mechanism. For example, the fixed shaft 512 may be connected to a drive shaft of a motor. The first optical path changing member 520 and the second optical path changing member 530 may be disposed in the movable member 510. For example, the first optical path changing member 520 may be disposed on one surface of the movable member 510, while the second optical path changing member 530 may be disposed on another surface of the movable member 510. The optical path changing members 520 and 530 are configured to change a path of light. For example, the optical path changing members 520 and 530 may be configured in the form of a prism, a reflector, or the like, which reflects or refracts incident light.

An example of usage of the camera module will be described with reference to FIGS. 3A, 3B, and 3C.

A camera module 100 may simultaneously or selectively capture an image of a subject located in different directions and at different distances through the lens modules 300 and 400. The camera module 100 may capture an image of a first object OB1 located on one side through the first lens module 300 or through the second lens module 400. As another example, the camera module 100 may capture an image of a second object OB2 located on the other side (for example, an opposite side) through the first lens module 300 or through the second lens module 400.

An example of usage of the camera module 100 will be described with reference to FIG. 3A. The camera module 100 may be configured to capture an image of the objects OB1 and OB2 located in a direction intersecting the first optical axis C1 and the second optical axis C2 as illustrated in FIG. 3A. For example, the camera module 100 may capture an image of the first object OB1 through the first lens module 300 and may capture an image of the second subject OB2 through the second lens module 400. Light reflected from the objects OB1 and OB2 may be reflected or refracted to each of the lens modules 300 and 400 by the optical path changing unit 500. For example, the light reflected from the first object OB1 may be reflected or refracted by the first optical path changing member 520 of the optical path changing unit 500 to be incident on the first lens module 300. Simultaneously or selectively, the light reflected from the second subject OB2 may be reflected or refracted by the second optical path changing member 530 of the optical path changing unit 500 to be incident on the second lens module 400.

Accordingly, the camera module 100 according to the present example can simultaneously or selectively capture images of the plurality of objects OB1 and OB2 located in different directions through the first lens module 300 and the second lens module 400.

Another example of usage of the camera module 100 will be described with reference to FIGS. 3B and 3C. The lens modules 300 and 400 for capturing images of the objects OB1 and OB2 may be changed according to a user's selection or when an image of satisfactory quality is not captured in an image capturing state previously described. For example, the camera module 100 operates the optical path changing unit 500 to change a path of light incident on the first and second lens modules 300 and 400 as illustrated in FIGS. 3B and 3C. In a state illustrated in FIG. 3B, the camera module can be rotated from the configuration shown in FIG. 3A to the configuration shown in FIG. 3C. In a state illustrated in FIG. 3C, the camera module 100 can capture an image of the second object OB2 through the first lens module 300 and an image of the first object OB1 through the second lens module 400. Light reflected from the objects OB1 and OB2 may be reflected or refracted to each of the lens modules 300 and 400 by the optical path changing unit 500. For example, light reflected from the first object OB1 may be reflected or refracted by the second optical path changing member 530 of the optical path changing unit 500 to be incident on the second lens module 400. Simultaneously or selectively, the light reflected from the second subject OB2 may be reflected or refracted by the first optical path changing member 520 of the optical path changing unit 500 to be incident on the first lens module 300.

Figure 3A:
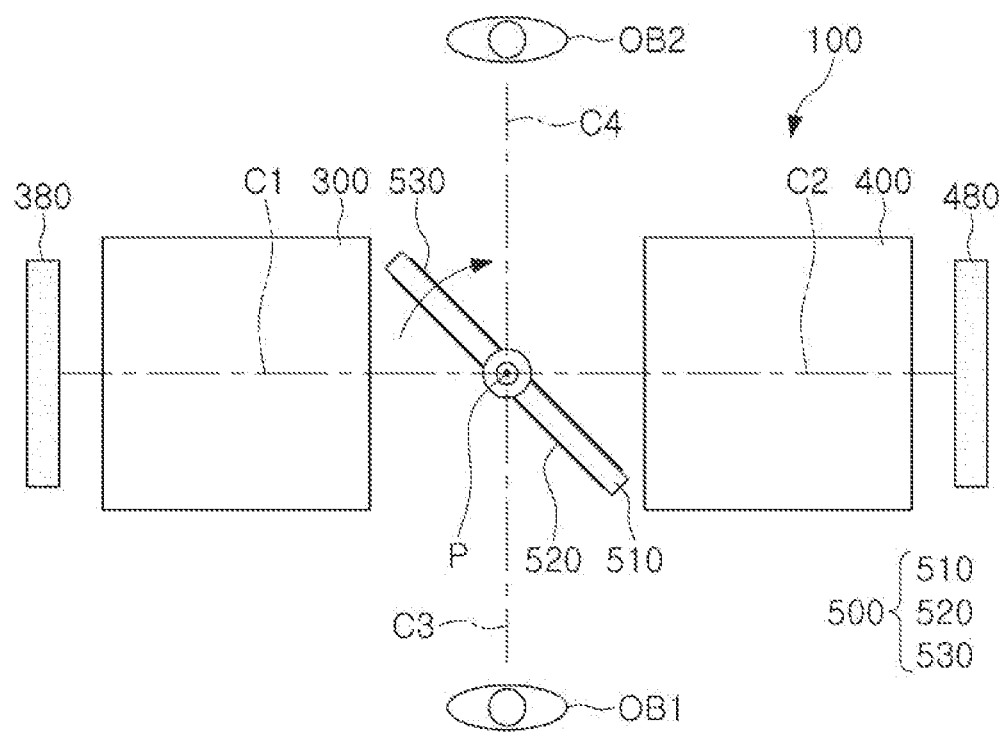
FIGS. 3A, 3B, and 3C are a diagram illustrating a usage state of the camera module illustrated in FIG. 1.
Figure 3B:
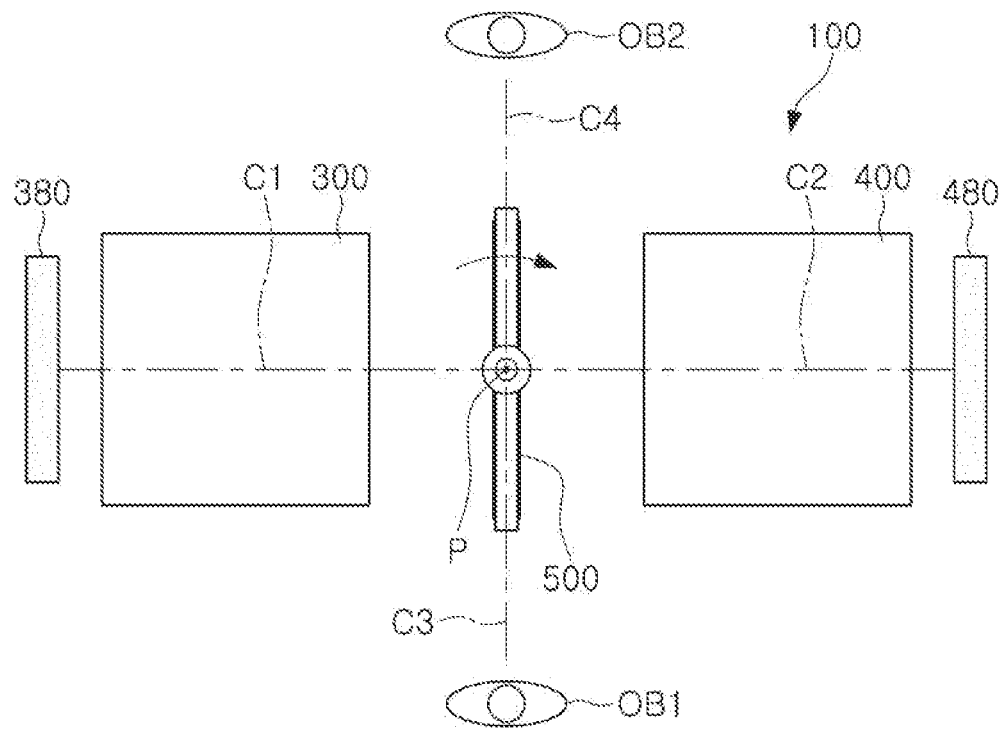
Figure 3C:
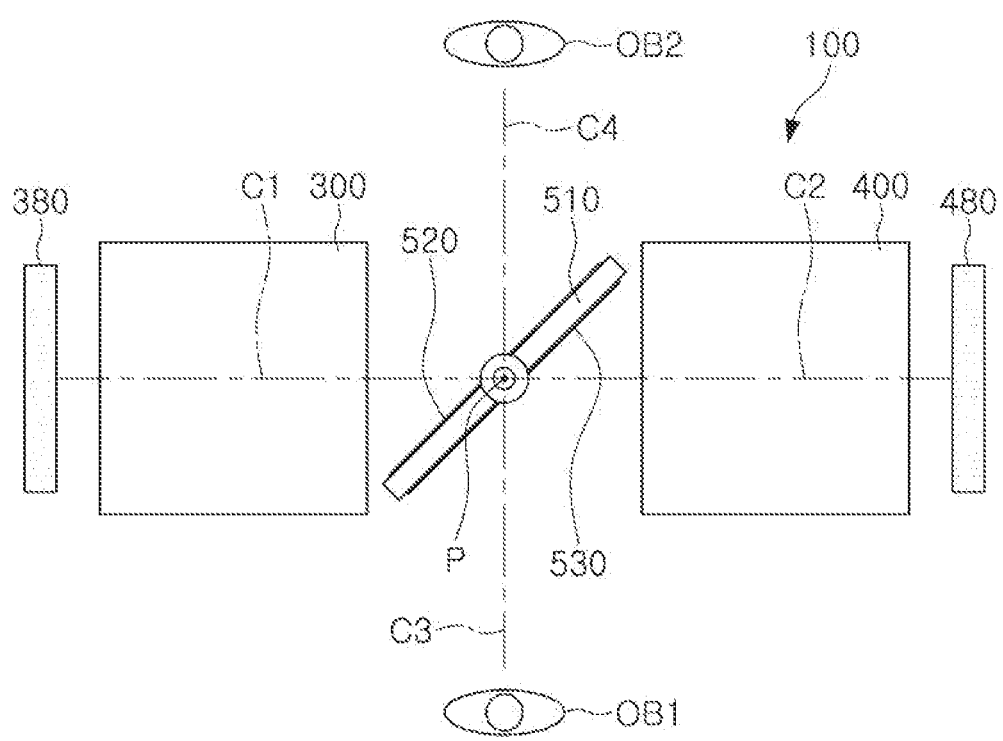

As the first and second lens modules 300 and 400 of the camera module 100 according to the present example have different optical characteristics, images of the objects OB1 and OB2 of desired quality or conditions can be captured through the series of processes illustrated in FIGS. 3A to 3C. For example, the camera module 100 can clearly capture an image of the first object OB1 located at long distance through the first lens module 300 or comprehensively capture an image of the first object OB1 located at long distance and a background thereof through the second lens module 400. Similarly, the camera module 100 magnifies and captures an image of the second object OB2 located at short distance through the first lens module 300 or clearly captures an image of the first object OB1 located at short distance through the second lens module 400.

The camera module 100 configured as described above may simultaneously capture subjects located in different directions. In addition, the camera module 100 according to the present example can easily change an image capturing form of a subject by changing an optical path incident on the lens modules 300 and 400.

Figure 4:
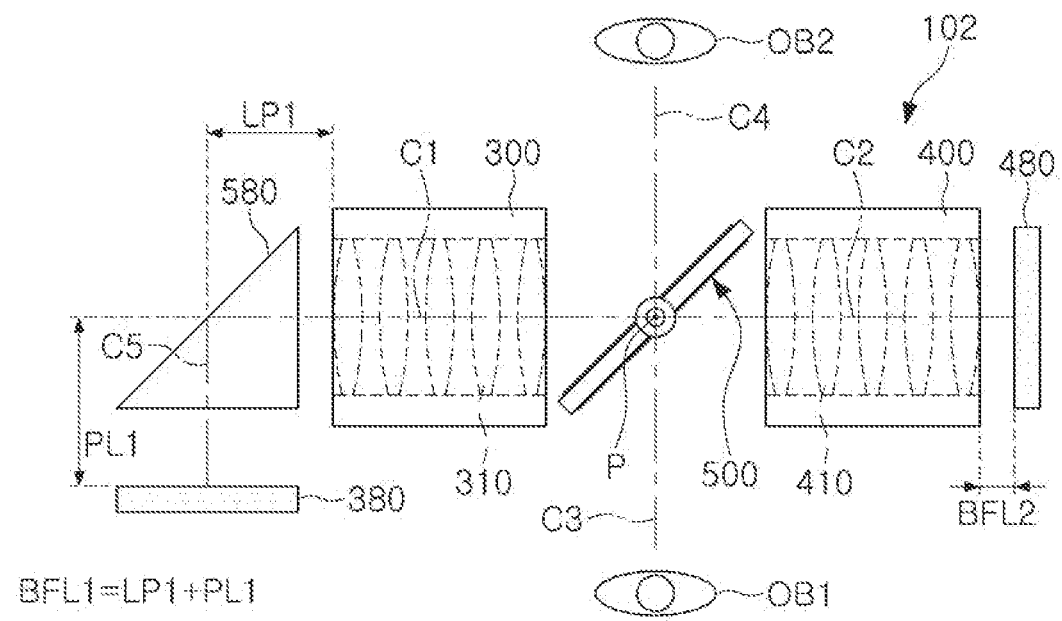
FIG. 4 is a diagram illustrating a configuration of a camera module according to another example.

A camera module according to another example will be described with reference to FIG. 4.

A camera module 102 may include a plurality of lens modules 300 and 400, a plurality of image sensors 380 and 480, and a first optical path changing unit 500. In addition, the camera module 102 may further include a second optical path changing unit 580.

The lens modules 300 and 400 may be configured to form an image of a subject in the image sensors 380 and 480. For example, a first lens module 300 is configured to form an image of light incident on the first image sensor 380, and a second lens module 400 is configured to form an image of light incident on the second image sensor 480. The lens modules 300 and 400 may include one or more lenses 310 and 410. For example, the first lens module 300 may include one or more first lenses 310, and the second lens module 400 may include one or more second lenses 410. The lenses 310 and 410 may be sequentially disposed along optical axes C1 and C2 of the lens modules 300 and 400. For example, the first lens(es) 310 may be sequentially disposed along the first optical axis C1 of the first lens module 300, while the second lens(es) 410 may be sequentially disposed along the second optical axis C2 of the second lens module 400.

The first lens module 300 and the second lens module 400 may have different focal lengths. For example, the first lens module 300 may have a greater focal length than the second lens module 400. The first lens module 300 and the second lens module 400 may be configured to capture an image of a subject located at a predetermined distance. For example, the first lens module 300 may be configured to capture an image of a subject located at long distance, while the second lens module 400 may be configured to capture an image of a subject located at short distance. The first lens module 300 and the second lens module 400 may be configured to have a predetermined angle of view. For example, the first lens module 300 may be configured to have a narrow angle of view, while the second lens module 400 may be configured to have a wide angle of view.

The first lens module 300 and the second lens module 400 may be disposed substantially in parallel. For example, the first optical axis C1 of the first lens module 300 and the second optical axis C2 of the second lens module 400 may be substantially parallel. The first optical axis C1 and the second optical axis C2 may be connected to each other. For example, the first optical axis C1 and the second optical axis C2 may lie on a same line.

The image sensors 380 and 480 are configured to convert optical signals refracted by the lens modules 300 and 400 into electric signals. For example, the first image sensor 380 converts an optical signal incident through the first lens module 300 into an electric signal, and the second image sensor 480 converts an optical signal incident through the second lens module 400 into an electric signal. The image sensors 380 and 480 may be manufactured in the form of a CCD. One surface of the respective image sensors 380 and 480 may form an image surface on which an image of light refracted by the lens modules 300 and 400 is formed.

The first image sensor 380 and the second image sensor 480 may be disposed on a virtual intersecting plane. For example, a plane on which the first image sensor 380 is disposed may intersect a plane on which the second image sensor 480 is disposed.

The first optical path changing unit 500 may be disposed between the first lens module 300 and the second lens module 400. For example, the first optical path changing unit 500 may be disposed between a distal end of the first lens module 300 and that of the second lens module 400. The first optical path changing unit 500 may be configured to convert a path of light incident on the camera module 100. For example, the first optical path changing unit 500 may reflect or refract light incident from a direction intersecting the first optical axis C1 and the second optical axis C2 to the first lens module 300 or the second lens module 400. The optical path changing unit 500 may be configured to form two optical paths. As an example, the first optical path changing unit 500 reflects or refracts light incident along a third optical axis C3 in the direction of the first optical axis C1 and reflects or refracts light incident along a fourth optical axis C4 in the direction of the optical axis C2. As another example, the first optical path changing unit 500 reflects or refracts light incident along the third optical axis C3 in the direction of the second optical axis C2 and reflects or refracts the light incident along the fourth optical axis C4 in the direction of the optical axis C1. The first optical path changing unit 500 may be configured to be rotatable. For example, the first optical path changing unit 500 may rotate with respect to a point P at which the first optical axis C1 and the third optical axis C3 intersect or a point P at which the second optical axis C2 and the fourth optical axis C4 intersect.

The second optical path changing unit 580 may be disposed between the first lens module 300 and the first image sensor 380. The second optical path changing unit 580 may reflect or refract light incident along the first optical axis C1 to the first image sensor 380. For example, the second optical path changing unit 580 may reflect or refract light incident along the first optical axis C1 in a direction of a fifth optical axis C5. The second optical path changing unit 580 may elongate a distance (optical axis reference distance) from the first lens module 300 to the first image sensor 380. For example, a distance (BFL1=LP1+PL1) from an end of the first lens module 300 to the first image sensor 380 may be greater than a distance (BFL2) from an end of the second lens module 400 to the second image sensor 480. Accordingly, the camera module 102 may implement a telephoto imaging optical system having a long back focal length through the first lens module 300 and the second optical path changing unit 580.

The camera module 102 configured as described above may selectively capture an image of a subject located at short distance or at long distance through the first lens module 300 and the second lens module 400. In addition, the camera module 102 may simultaneously capture images of subjects located at short distance and at long distance.

As an example, the camera module 102 may capture an image of a first object OB1 located at long distance through the first lens module 300 and simultaneously capture an image of a second object OB2 located at short distance with the second lens module 400. As another example, the camera module 102 may rotate the first optical path changing unit 500 to magnify and capture an image of the second object OB2 located at short distance with the first lens module 300 and may integrally capture an image of the first object OB1 located at long distance and a background thereof with the second lens module 400.

Figure 5:
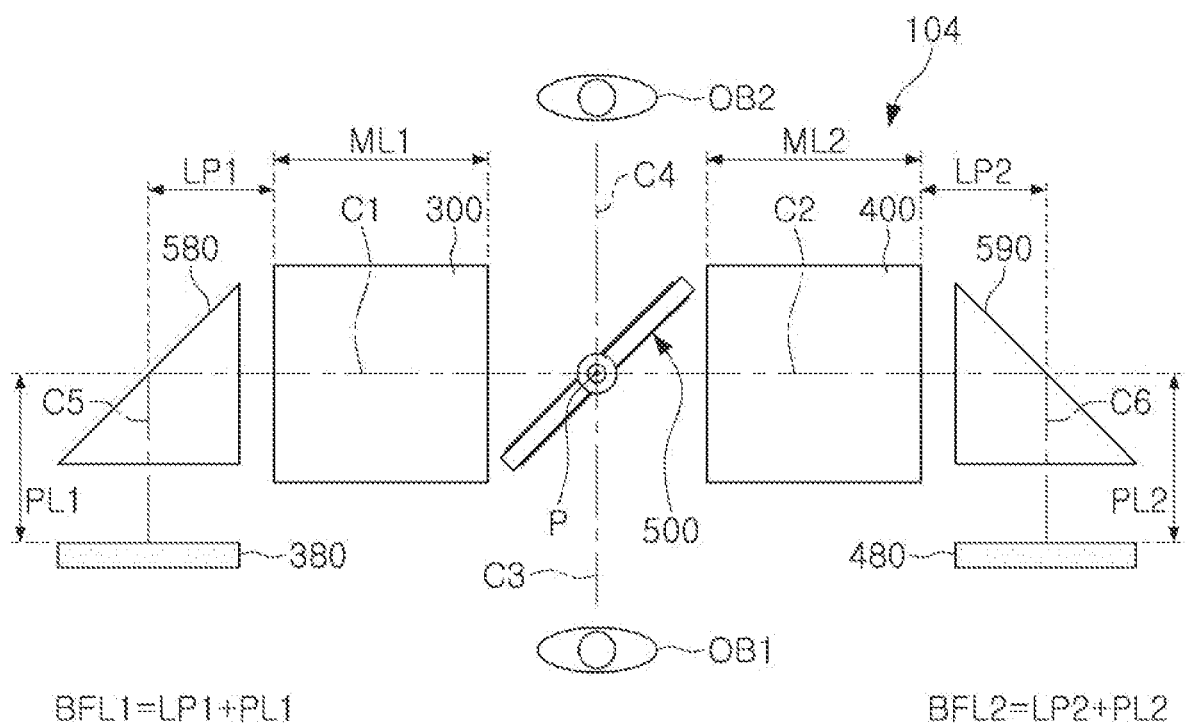
FIG. 5 is a diagram illustrating a configuration of a camera module according to another example.
Figure 6:
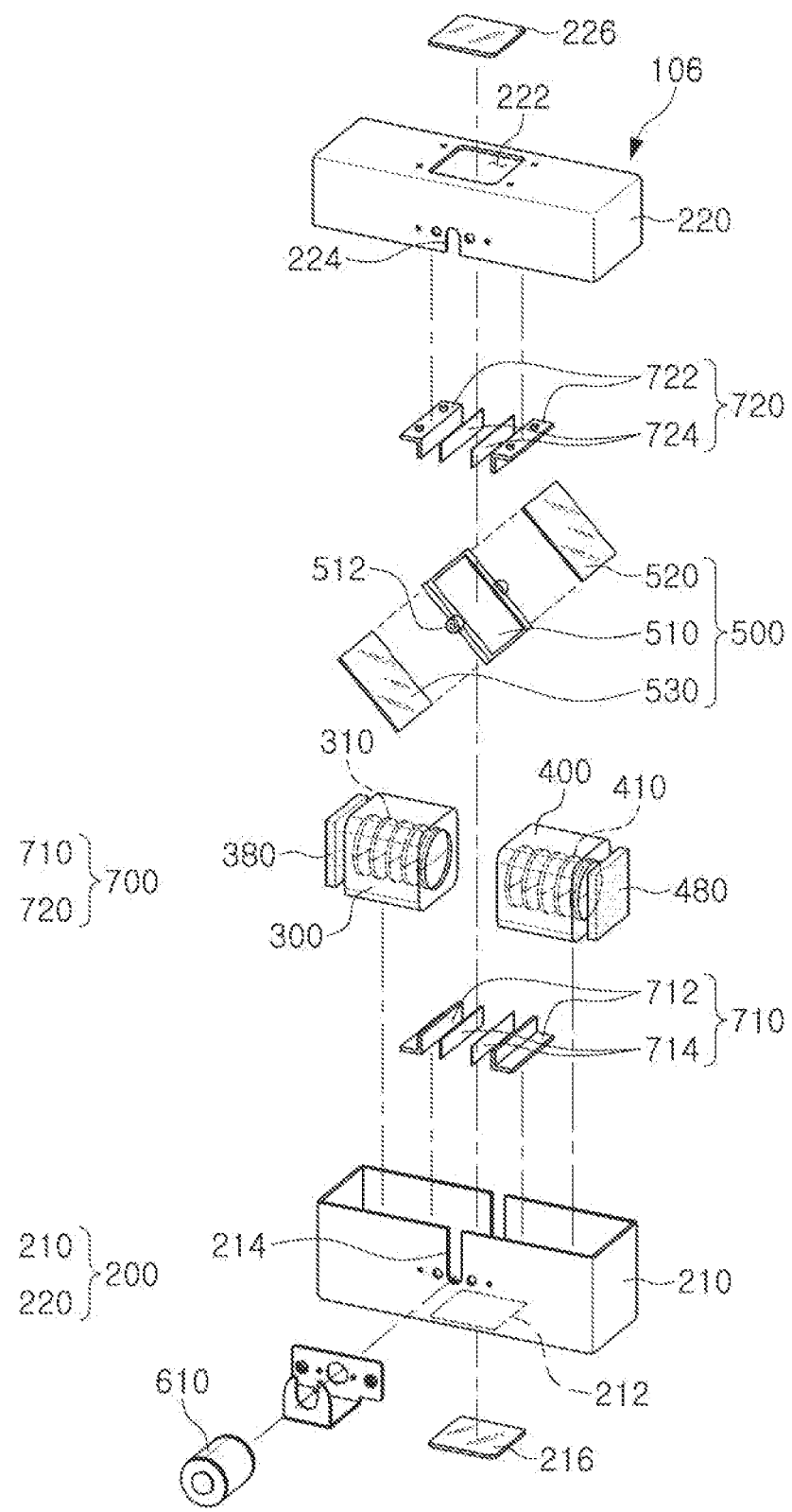
FIG. 6 is a diagram illustrating a configuration of a camera module according to another example.

A camera module according to another example will be described with reference to FIG. 5.

A camera module 104 may include a plurality of lens modules 300 and 400, a plurality of image sensors 380 and 480, and a first optical path changing unit 500. In addition, the camera module 104 may further include a second optical path changing unit 580 and a third optical path changing unit 590.

The lens modules 300 and 400 may be configured to form an image of a subject in the image sensors 380 and 480. For example, a first lens module 300 is configured to form an image of light incident on the first image sensor 380, and a second lens module 400 is configured to form an image of light incident on the second image sensor 480. The lens modules 300 and 400 may include one or more lenses 310 and 410. For example, the first lens module 300 may include one or more first lenses 310, and the second lens module 400 may include one or more second lenses 410. The lenses 310 and 410 may be sequentially disposed along optical axes C1 and C2 of the lens modules 300 and 400. For example, the first lens(es) 310 may be sequentially disposed along the first optical axis C1 of the first lens module 300, while the second lens(es) 410 may be sequentially disposed along the second optical axis C2 of the second lens module 400.

The first lens module 300 and the second lens module 400 may have different focal lengths. For example, the first lens module 300 may have a greater focal length than the second lens module 400. The first lens module 300 and the second lens module 400 may be configured to capture an image of a subject located at a predetermined distance. For example, the first lens module 300 may be configured to capture an image of a subject located at long distance, while the second lens module 400 may be configured to capture an image of a subject located at short distance. The first lens module 300 and the second lens module 400 may be configured to have a predetermined angle of view. For example, the first lens module 300 may be configured to have a narrow angle of view, while the second lens module 400 may be configured to have a wide angle of view. A distance from the first lens module 300 to the first image sensor 380 may be different from that from the second lens module 400 to the second image sensor 480. For example, a distance (BFL1=LP1+PL1) from the end of the first lens module 300 to the first image sensor 380 may be greater than a distance (BFL2=LP2+PL2) from the end of the second lens module 400 to the second image sensor 480.

The first lens module 300 and the second lens module 400 may be disposed substantially in parallel. For example, the first optical axis C1 of the first lens module 300 and the second optical axis C2 of the second lens module 400 may be substantially parallel. The first optical axis C1 and the second optical axis C2 may be connected to each other. For example, the first optical axis C1 and the second optical axis C2 may lie on a same line.

The image sensors 380 and 480 are configured to convert optical signals refracted by the lens modules 300 and 400 into electric signals. For example, the first image sensor 380 converts an optical signal incident through the first lens module 300 into an electric signal, and the second image sensor 480 converts an optical signal incident through the second lens module 400 into an electric signal. The image sensors 380 and 480 may be manufactured in the form of a CCD. One surface of each of the image sensors 380 and 480 may form image surfaces on which an image of light refracted by the lens modules 380 and 480 is formed.

The first image sensor 380 and the second image sensor 480 may be disposed on a substantially same plane. For example, the first image sensor 380 and the second image sensor 480 may be disposed on a single substrate. However, the first image sensor 380 and the second image sensor 480 are not necessarily disposed on a single substrate. For example, the first image sensor 380 and the second image sensor 480 may be disposed on different substrates.

The first optical path changing unit 500 may be disposed between the first lens module 300 and the second lens module 400. For example, the first optical path changing unit 500 may be disposed between a distal end of the first lens module 300 and that of the second lens module 400. The first optical path changing unit 500 may be configured to convert a path of light incident on the camera module 104. For example, the first optical path changing unit 500 may reflect or refract light incident from a direction intersecting the first optical axis C1 and the second optical axis C2 to the first lens module 300 or the second lens module 400. The optical path changing unit 500 may be configured to form two optical paths. As an example, the first optical path changing unit 500 reflects or refracts light incident along the third optical axis C3 in the direction of the first optical axis C1 and reflects or refracts light incident along the fourth optical axis C4 in the direction of the optical axis C2. As another example, the first optical path changing unit 500 reflects or refracts light incident along the third optical axis C3 in the direction of the second optical axis C2 and reflects or refracts the light incident along the fourth optical axis C4 in the direction of the optical axis C1. The first optical path changing unit 500 may be configured to be rotatable. For example, the first optical path changing unit 500 may rotate with respect to a point P at which the first optical axis C1 and the third optical axis C3 intersect or a point P at which the second optical axis C2 and the fourth optical axis C4 intersect.

The second optical path changing unit 580 may be disposed between the first lens module 300 and the first image sensor 380. The second optical path changing unit 580 may reflect or refract light incident along the first optical axis C1 to the first image sensor 380. For example, the second optical path changing unit 580 may reflect or refract light incident along the first optical axis C1 in a direction of a fifth optical axis C5. The second optical path changing unit 580 may elongate a distance (optical axis reference distance) from the first lens module 300 to the first image sensor 380. For example, the second optical path changing unit 580 may increase a distance (ML1+LP1+PL1) from the distal end of the first lens module 300 to the first image sensor 380 and a distance (LP1+PL1) from an end of the first lens module 300 to the first image sensor 380. Accordingly, the camera module 104 may implement an optical imaging system having a long back focal length, which is difficult to mount in a small camera module.

The third optical path changing unit 590 may be disposed between the second lens module 400 and the second image sensor 480. The third optical path changing unit 590 may reflect or refract light incident along the second optical axis C2 to the second image sensor 480. For example, the third optical path changing unit 590 may reflect or refract light incident along the second optical axis C2 in the direction of a sixth optical axis C6. The third optical path changing unit 590 may increase a distance (optical axis reference distance) from the second lens module 400 to the second image sensor 480. For example, the third optical path changing unit 590 may increase a distance (ML2+LP2+PL2) from the distal end of the second lens module 400 to the second image sensor 480 and the distance (LP2+PL2) from the end of the second lens module 400 to the second image sensor 480. Accordingly, the camera module 104 may include a plurality of optical imaging systems having a long focal length.

The camera module 104 configured as described above may selectively capture images of subjects located at long distance or at an intermediate distance with the first lens module 300 and the second lens module 400. In addition, the camera module 104 may simultaneously capture images of subjects located at short distance and at long distance.

A camera module according to another example will be described with reference to FIGS. 6 to 9.

A camera module 106 may include a housing 200, a first lens module 300, a second lens module 400, a first image sensor 380, a second image sensor 480, and an optical path changing unit 500. The camera module 106 may further include a first driving mechanism 610 and a buffer mechanism 700.

The housing 200 may be configured to accommodate main components configuring the camera module 106 therein. For example, the housing 200 may accommodate the lens modules 300 and 400, image sensors 380 and 480, the optical path changing unit 500, and the buffer mechanism 700 therein. The housing 200 may include a first housing 210 and a second housing 220. However, a configuration of the housing 200 is not limited to the first housing 210 and the second housing 220. For example, the housing 200 may further include an additional supplementary housing if necessary.

Windows 212 and 222, through which light may be transmitted, may be formed in the first housing 210 and the second housing 220. For example, a first window 212 may be formed in the first housing 210, and a second window 222 may be formed in the second housing 220. Protective covers 216 and 226 may be disposed on the windows 212 and 222. The protective covers 216 and 226 may be formed of a transparent material such that light can be transmitted therethrough. For example, the protective covers 216 and 226 may be formed of a glass material. Coupling grooves 214 and 224 for supporting the optical path changing unit 500 may be formed in the first housing 210 and the second housing 220. For example, the coupling groove 214 of the first housing 210 and the coupling groove 224 of the second housing 220 may be fixed by a fixing shaft 512 of the optical path changing unit 500 inserted thereto.

The lens modules 300 and 400 may be configured to form an image of a subject in the image sensors 380 and 480. For example, the first lens module 300 is configured to form an image of light incident on the first image sensor 380, and the second lens module 400 is configured to form an image of light incident on the second image sensor 480. The lens modules 300 and 400 may include one or more lenses 310 and 410. For example, the first lens module 300 may include one or more first lenses 310, and the second lens module 400 may include one or more second lenses 410. The lenses 310 and 410 may be sequentially disposed along optical axes C1 and C2 of the lens modules 300 and 400. For example, the first lens(es) 310 may be sequentially disposed along the first optical axis C1 of the first lens module 300, while the second lens(es) 410 may be sequentially disposed along the second optical axis C2 of the second lens module 400.

The first lens module 300 and the second lens module 400 may have different focal lengths. For example, the first lens module 300 may have a greater focal length than the second lens module 400. The first lens module 300 and the second lens module 400 may be configured to capture an image of a subject located at a predetermined distance. For example, the first lens module 300 may be configured to capture an image of a subject located at long distance, while the second lens module 400 may be configured to capture an image of a subject located at an intermediate distance. The first lens module 300 and the second lens module 400 may be configured to have a predetermined angle of view. For example, the first lens module 300 may be configured to have a narrow angle of view, while the second lens module 400 may be configured to have a wide angle of view. The first lens module 300 and the second lens module 400 may be disposed substantially in parallel. For example, the first optical axis C1 of the first lens module 300 and the second optical axis C2 of the second lens module 400 may be substantially parallel. The first optical axis C1 and the second optical axis C2 may be connected to each other. For example, the first optical axis C1 and the second optical axis C2 may lie on a same line.

The image sensors 380 and 480 are configured to convert optical signals refracted by the lens modules 300 and 400 into electric signals. For example, the first image sensor 380 converts an optical signal incident through the first lens module 300 into an electric signal, and the second image sensor 480 converts an optical signal incident through the second lens module 400 into an electric signal. The image sensors 380 and 480 may be manufactured in the form of a CCD. One surface of each of the image sensors 380 and 480 may form image surfaces on which an image of light refracted by the lens modules 380 and 480 is formed.

The optical path changing unit 500 may be disposed between the first lens module 300 and the second lens module 400. For example, the optical path changing unit 500 may be disposed between a distal end of the first lens module 300 and that of the second lens module 400. The optical path changing unit 500 may be configured to convert a path of light incident on the camera module 106. For example, the optical path changing unit 500 may reflect or refract light incident from a direction intersecting the first optical axis C1 and the second optical axis C2 (for example, along the third optical axis C3 or the fourth optical axis C4) to the first lens module 300 or the second lens module 400.

The optical path changing unit 500 may include a movable member 510, a first optical path changing member 520, and a second optical path changing member 530. However, a configuration of the optical path changing unit 500 is not limited thereto. The movable member 510 may be configured to be rotatable. For example, the movable member 510 may rotate with respect to a fixed shaft 512. The fixed shaft 512 may be connected to the first driving mechanism 610. For example, the fixed shaft 512 may be connected to a driving shaft of the first driving mechanism 610. The first optical path changing member 520 and the second optical path changing member 530 may be disposed on the movable member 510. For example, the first optical path changing member 520 may be disposed on one surface of the movable member 510, and the second optical path changing member 530 may be disposed on another (opposite) surface of the movable member 510. The optical path changing members 520 and 530 are configured to convert a path of light. For example, the optical path changing members 520 and 530 may be configured in the form of a prism, a reflector, or the like, which reflects or refracts incident light.

The first driving mechanism 610 is configured to drive the optical path changing unit 500. For example, the first driving mechanism 610 is disposed on one side of the housing 200 to rotate the optical path changing unit 500. The first driving mechanism 610 may be in the form of a motor. However, a configuration of the first driving mechanism 610 is not limited to a motor. For example, the first driving mechanism 610 may be a driving device other than a piezoelectric element.

The buffer mechanism 700 may be formed in the housing 200 and may include a first buffer part 710 and a second buffer part 720. For example, the first buffer part 710 may be disposed in the first housing 210, and the second buffer part 720 may be disposed in the second housing 220. The buffer mechanism 700 may include support members 712 and 722 and buffer members 714 and 724. The support members 712 and 722 are disposed in the housing 200. For example, the first support member 712 may be formed at an edge of the first window 212, while the second support member 722 may be formed at an edge of the second window 222. The support members 712 and 722 may support the buffer members 714 and 724 so as to be positioned on a rotation path of the optical path changing unit 500. For example, the first support member 712 may support the first buffer member 714 such that one end of the movable member 510 and the first buffer member 714 contact at a still position of the movable member 510. In addition, the second support member 722 may support the second buffer member 724 such that the other end of the movable member 510 and the second buffer member 724 contact at the still position of the movable member 510.

Figure 7:
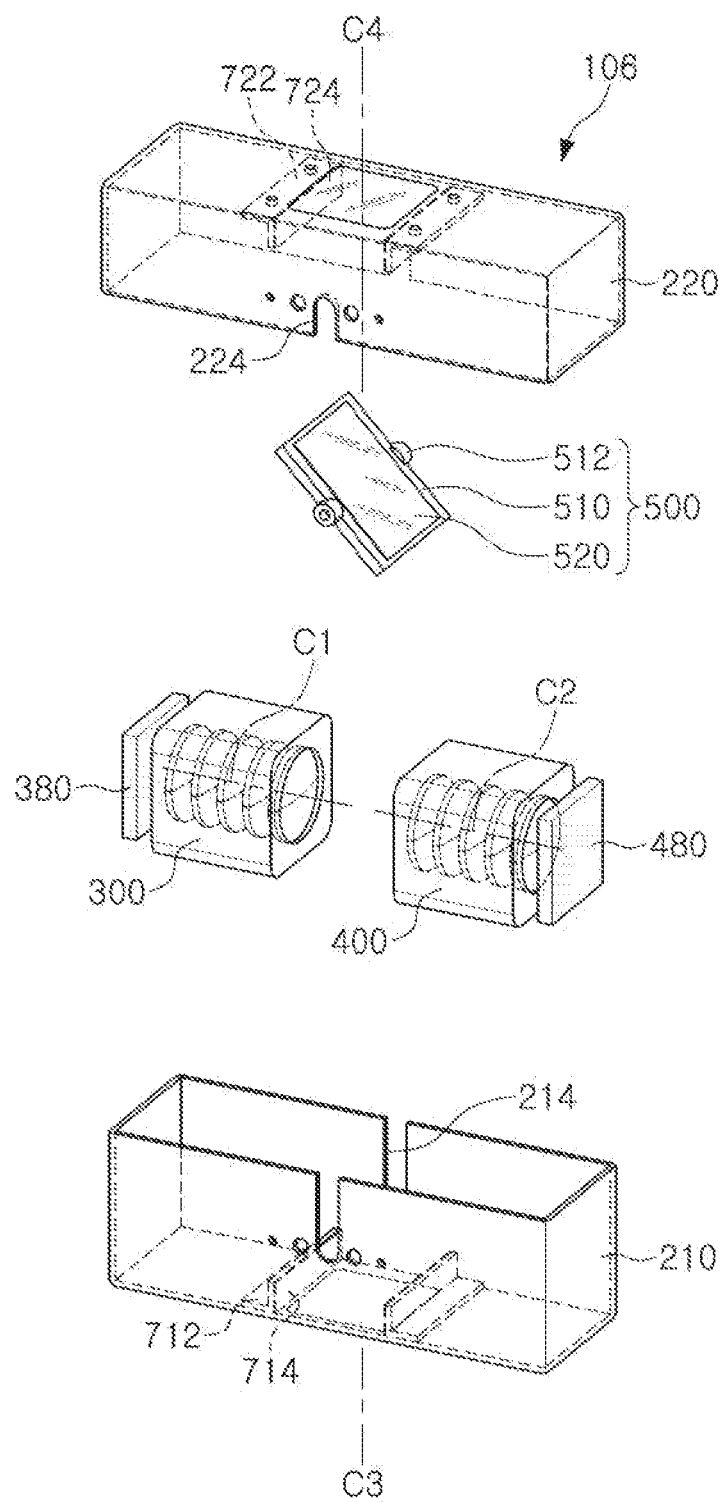
FIGS. 7 and 8 are partial perspective views of the camera module illustrated in FIG. 6.
Figure 8:
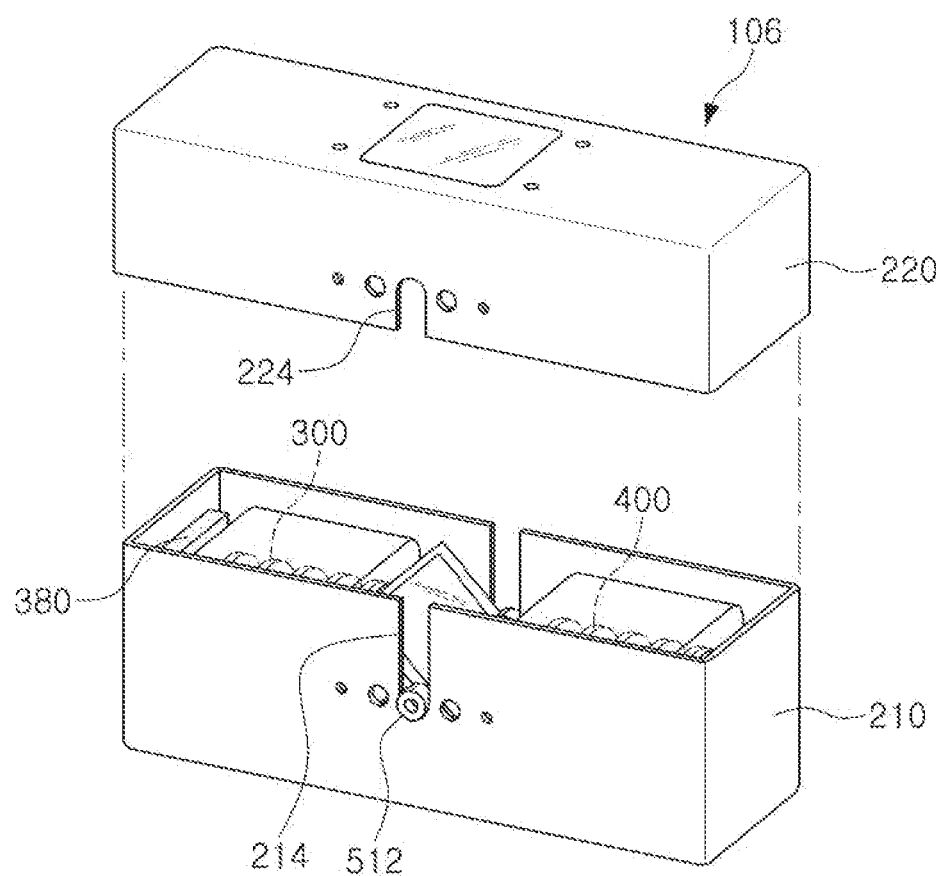
Figure 9:
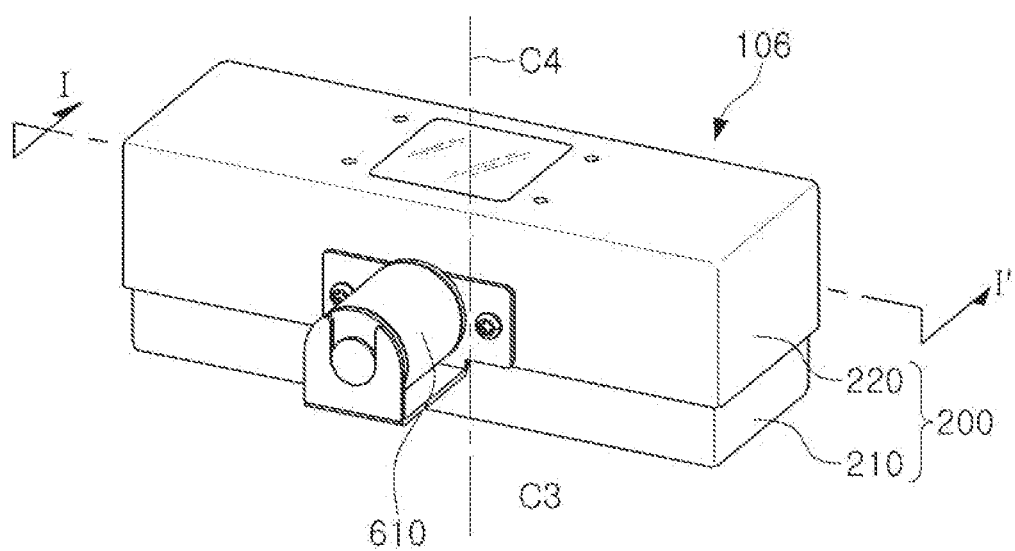
FIG. 9 is a perspective view illustrating an assembly of the camera module illustrated in FIG. 6.

The camera module 106 configured as described above may be accomplished by sequentially arranging the lens modules 300 and 400, the image sensors 380 and 480, and the optical path changing unit 500 in the first housing 210 as illustrated in FIGS. 7 and 9 and covering an upper portion of the first housing 210 with the second housing 220 as illustrated in FIG. 9. Accordingly, the camera module 106 according to the present example may be advantageous in rapid assembly and miniaturization thereof.

An example of usage of the camera module will be described with reference to FIGS. 10A, 10B, and 100.

Figure 10A:
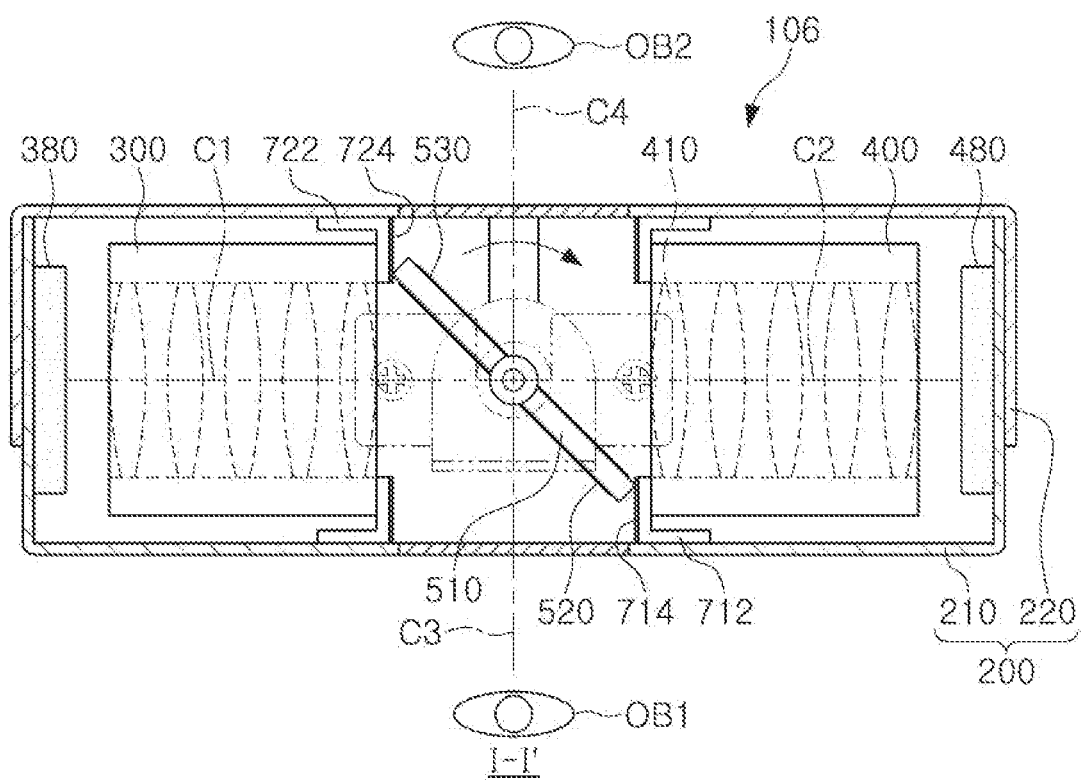
FIGS. 10A, 10B, and 10C are a cross-sectional view illustrating a usage state of the camera module illustrated in FIG. 6.

As illustrated in FIG. 10A, the camera module 106 may be configured to capture images of objects OB1 and OB2 located in a direction intersecting the first optical axis C1 and the second optical axis C2. For example, the camera module 106 may capture an image of the first object OB1 with the first lens module 300 and an image of the second object OB2 with the second lens module 400. Light reflected from the objects OB1 and OB2 may be reflected or refracted to each of the lens modules 300 and 400 by the optical path changing unit 500. For example, the light reflected from the first object OB1 may be reflected or refracted by the first optical path changing member 520 of the optical path changing unit 500 to be incident on the first lens module 300. Simultaneously or selectively, the light reflected from the second object OB2 may be reflected or refracted by the second optical path changing member 530 of the optical path changing unit 500 to be incident on the second lens module 400. In an image capturing state previously described, the optical path changing unit 500 may be stably supported by the buffer members 714 and 724, and damage of the optical path changing members 520 and 530 resulting from frequent rotational operations of the optical path changing unit 500 may be reduced.

Accordingly, the camera module 106 according to the present example may simultaneously or selectively capture images of the objects OB1 and OB2 located in different directions with the first and second lens modules 300 and 400.

The camera module 106 may change the lens modules 300 and 400 for capturing the objects OB1 and OB2 according to user's selection. For example, the camera module 106 operates the optical path changing unit 500 to change a path of light incident on the first and second lens modules 300 and 400 as illustrated in FIGS. 10B and 10C. In a state illustrated in FIG. 10B, the camera module 106 can be rotated from the configuration shown in FIG. 10A to the configuration shown in FIG. 10C. In a state illustrated in FIG. 10C, the camera module 106 can capture an image of the second object OB2 with the first lens module 300 and an image of the first object OB1 with the second lens module 400. Light reflected from the objects OB1 and OB2 may be reflected or refracted to each of the lens modules 300 and 400 by the optical path changing unit 500. For example, the light reflected from the first object OB1 may be reflected or refracted by the second optical path changing member 530 of the optical path changing unit 500 to be incident on the second lens module 400. Simultaneously or selectively, the light reflected from the second subject OB2 may be reflected or refracted by the first optical path changing member 520 of the optical path changing unit 500 to be incident on the first lens module 300.

Figure 10B:
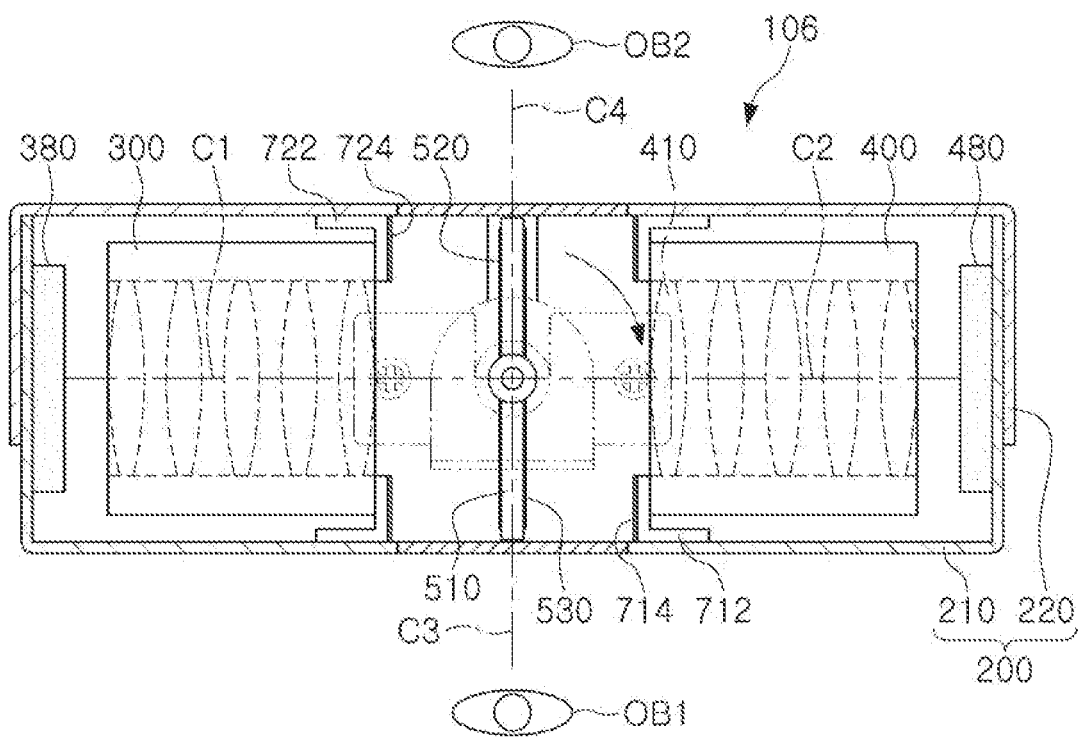
Figure 10C:
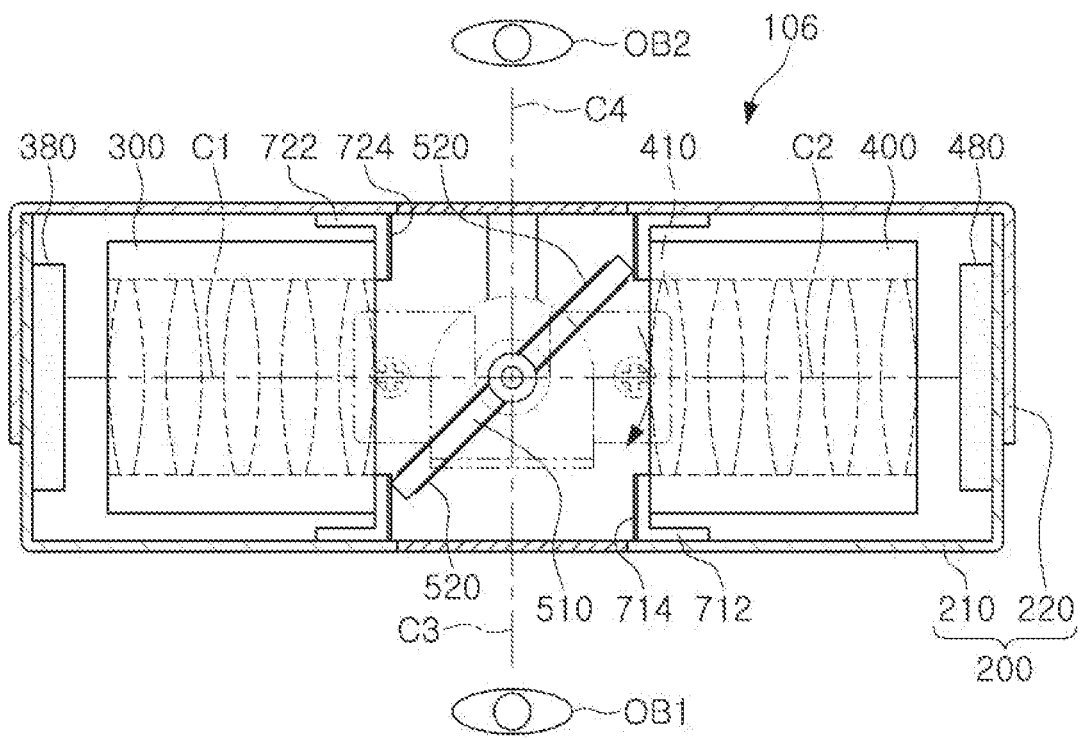

As the first and second lens modules 300 and 400 of the camera module 106 may have different optical characteristics, the images of the objects OB1 and OB2 can be captured to have desired quality or conditions through the series of processes illustrated in FIGS. 10A to 10C. For example, the camera module 106 can clearly capture an image of the first object OB1 located at a long distance with the first lens module 300 or comprehensively capture an image of the first object OB1 located at a long distance and a background thereof with the second lens module 400. Similarly, the camera module 106 magnifies and captures an image of the second object OB2 located at short distance with the first lens module 300 or clearly captures an image of the first object OB1 located at short distance with the second lens module 400.

The camera module 106 configured as described above may simultaneously capture images of subjects located in different directions. In addition, the camera module 106 can easily change an image capturing form of a subject by changing an optical path incident on the lens modules 300 and 400. Further, the camera module 106 can stably support a reflection position of the optical path changing unit 500 with the buffer members 714 and 724 and can reduce damage resulting from frequent rotational operations of the optical path changing unit 500.

An example of usage of a camera module according to another example will be described with reference to FIG. 11.

A camera module 108 may have substantially the same configuration as or a similar configuration to that of the camera module 106 described above. For example, the housing 200, the lens modules 300 and 400, the image sensors 380 and 480, the optical path changing unit 500, and the buffer parts 710 and 720 of the camera module 108 may be substantially the same as those of the above-described camera module 106. Accordingly, descriptions of the housing 200, the lens modules 300 and 400, the image sensors 380 and 480, the optical path changing unit 500, and the buffer parts 710 and 720 will be omitted.

The camera module 108 may further include a second driving mechanism 620. The second driving mechanism 620 may include a second driving magnet 622 and a second driving coil 624. The second driving magnet 622 may be disposed in the first lens module 300, and the second driving coil 624 may be disposed in the housing 200. The second driving mechanism 620 may be configured to drive the first lens module 300. For example, the second driving mechanism 620 may adjust a focus of the first lens module 300 or change a focal length of the first lens module 300 by moving the first lens module 300 along the first optical axis C1.

Figure 11:
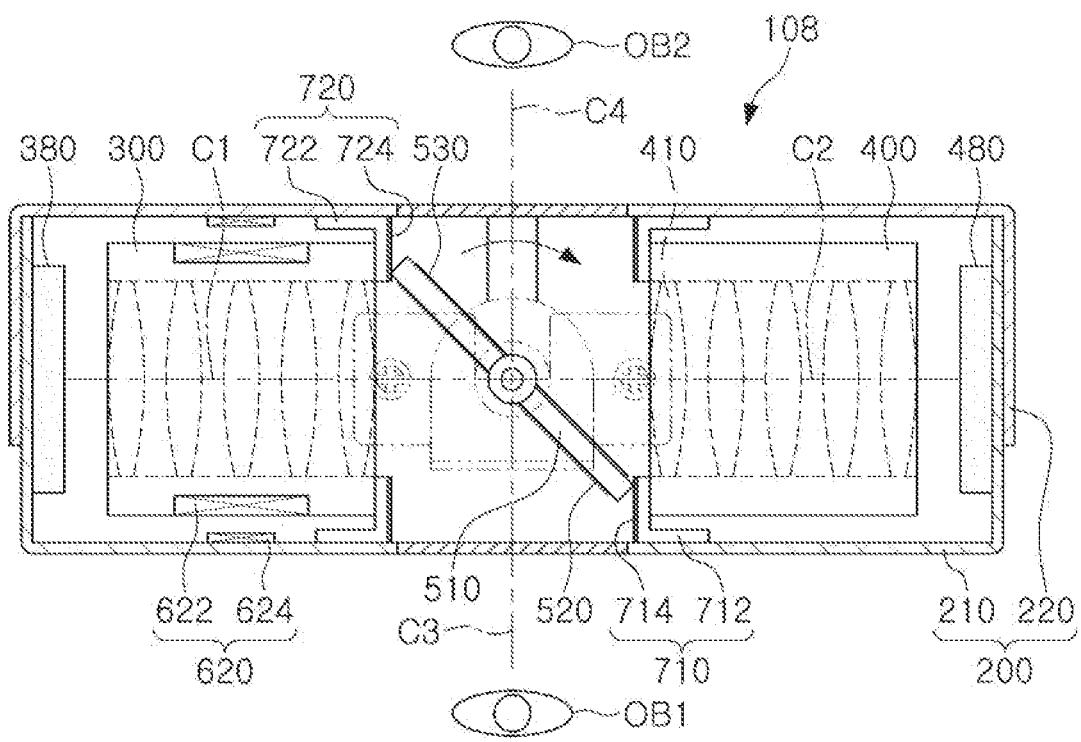
FIG. 11 is a cross-sectional view of the camera module according to another example.

For reference, although only the second driving mechanism 620 for driving the first lens module 300 is illustrated in FIG. 11, a second driving mechanism for driving the second lens module 400 may be further included.

The camera module 108 configured as described above may adjust or change a focus of the first lens module 300 with the second driving mechanism 620 and can thus capture an image of a subject in various forms. For example, the camera module 108 according to the present example can capture an image of a subject not only with the first lens module 300 or the second lens module 400 but also with the first lens module 300 having a focus adjusted or changed by the second driving mechanism 620. Accordingly, the camera module 108 may improve not only a type of image capture but also quality of image capture.

Figure 12:
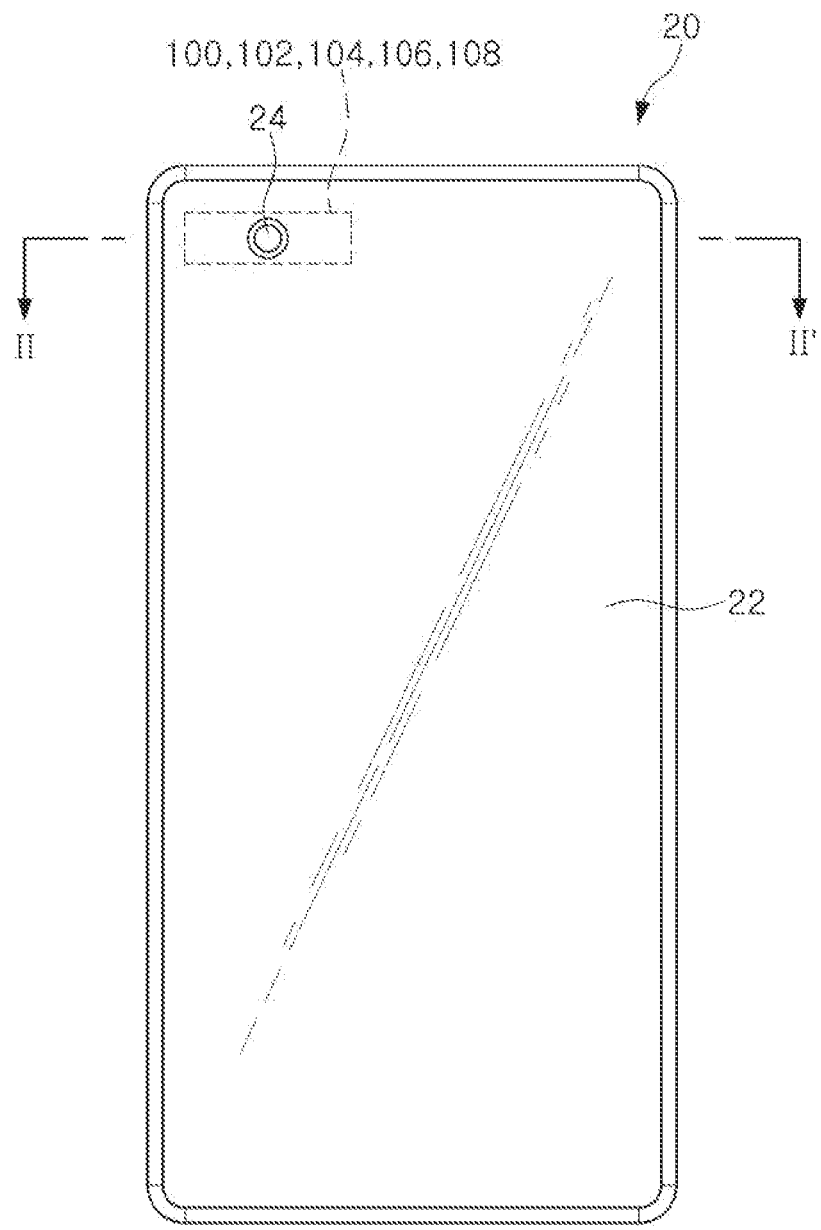
FIGS. 12 and 13 are a front view and a rear view of a portable terminal according to an example.
Figure 13:
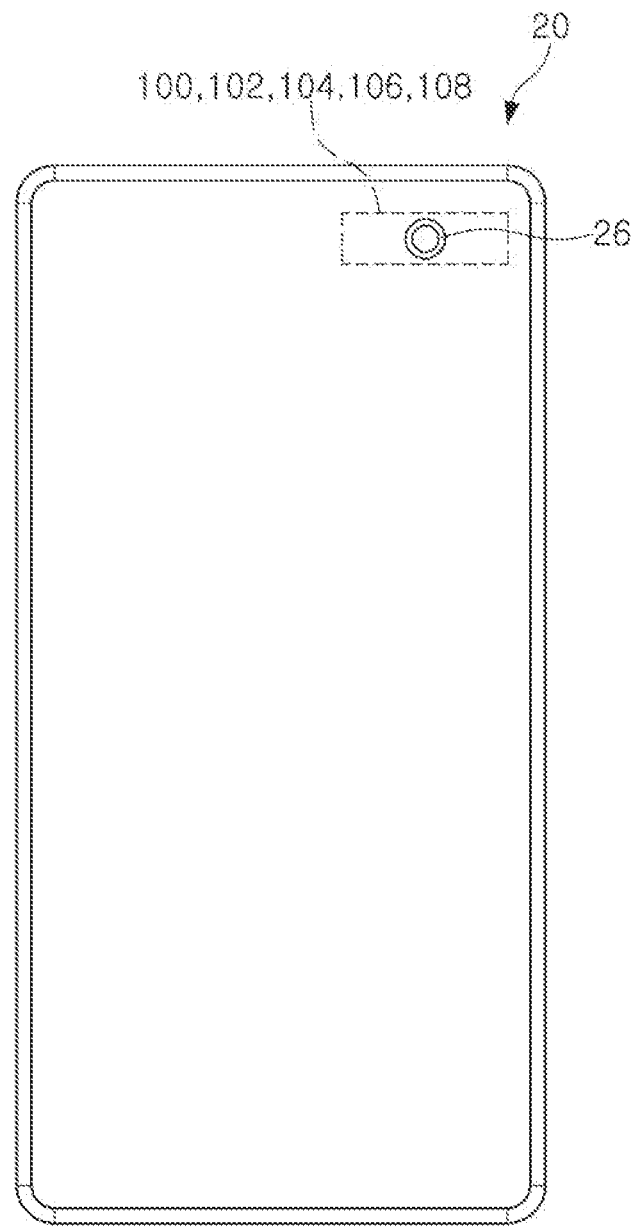
Figure 14:
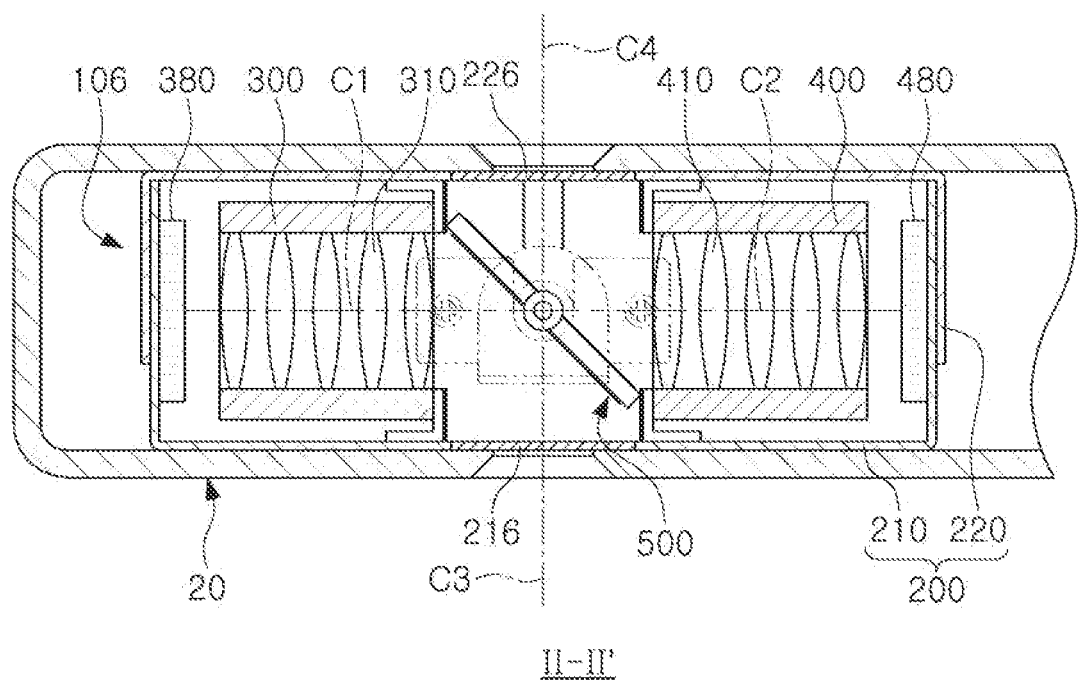
FIG. 14 is a cross-sectional view of the portable terminal illustrated in FIG. 12.

A portable terminal according to an example will be described with reference to FIGS. 12 to 14.

A portable terminal 20 may include a camera module. For example, the portable terminal 20 may include any one of the previously described camera modules 100, 102, 104, 106 and 108. The portable terminal 20 may include a liquid crystal display (LCD) 22. The LCD 22 may exhibit a still image or a video image captured by the camera modules 100, 102, 104, 106 and 108 or pre-captured still image or video image.

Incident windows 24 and 26 may be formed in the portable terminal 20. For example, a first incident window 24 may be formed on a front surface of the mobile terminal 20, and a second incident window 26 may be formed on a rear surface of the portable terminal 20. An optical path connected to the camera modules 100, 102, 104, 106 and 108 through the incident windows 24 and 26 of the portable terminal 20 may be formed. For example, a third optical path C3 may be formed through the first incident window 24, and a fourth optical path C4 may be formed through the second incident window 26. Light incident on the camera modules 100, 102, 104, 106 and 108 along the third optical path C3 and the fourth optical path C4 may selectively reach the first image sensor 380 or the second image sensor 480 by the optical path changing unit 500 of the camera module.

The portable terminal 20 configured as described above may simultaneously or selectively capture images of subjects located in a front and a rear of the portable terminal 20 with the plurality of lens modules 300 and 400 and the plurality of image sensors 380 and 480.

According to the aforementioned examples, disclosure camera module enables selective capture of an image of a subject located in a front and rear through different optical characteristics.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a first lens module defining a first optical axis;
a second lens module defining a second optical axis; and
a first optical path changing unit disposed between the first lens module and the second lens module and configured to selectively reflect or refract light incident along a third optical axis intersecting the first optical axis and the second optical axis to the first lens module and the second lens module.

2. The camera module of claim 1, wherein the first lens module and the second lens module have different optical characteristics.

3. The camera module of claim 1, wherein the first optical axis and the second optical axis are collinear.

4. The camera module of claim 1, wherein the first optical path changing unit is disposed between a distal end of the first lens module and a distal end of the second lens module.

5. The camera module of claim 1, further comprising:
a first image sensor in which an image of light incident through the first lens module is formed; and
a second image sensor in which an image of light incident through the second lens module is formed.

6. The camera module of claim 5, wherein a distance between a distal end of the first lens module and the first image sensor is different from a distance between a distal end of the second lens module and the second image sensor.

7. The camera module of claim 5, further comprising a second optical path changing unit disposed between the first lens module and the first image sensor.

8. The camera module of claim 5, comprising a third optical path changing unit disposed between the second lens module and the second image sensor.

9. The camera module of claim 1, wherein the first optical path changing unit comprises:
a movable member configured to rotate with respect to a point in which the first optical axis and the third optical axis intersect;
a first optical path changing member disposed on a first surface of the movable member; and
a second optical path changing member disposed on a second surface of the movable member.

10. The camera module of claim 1, further comprising a driving mechanism configured to drive the first optical path changing unit.

11. The camera module of claim 1, further comprising a housing accommodating the first lens module, the second lens module, and the first optical path changing unit, the housing defining an incident window through which the light incident along the third optical axis passes.

12. The camera module of claim 11, further comprising a buffer mechanism disposed in the housing and configured to prevent a collision between the first optical path changing unit and the first and second lens modules.

13. The camera module of claim 12, wherein the buffer mechanism comprises:
a support member disposed in the housing; and
an elastically deformable buffer member disposed in the support member.

14. The camera module of claim 11, further comprising a driving mechanism configured to move the first lens module along the first optical axis.

15. The camera module of claim 14, wherein the driving mechanism comprises:
a driving magnet disposed in the first lens module; and
a driving coil disposed in the housing.

16. A portable terminal comprising the camera module of claim 1.

17. A camera module, comprising:
a first lens module comprising one or more lenses aligned along a first optical axis;
a second lens module comprising one or more lenses aligned along a second optical axis that is parallel to the first optical axis; and
an optical path changing mechanism disposed between the first lens module and the second lens module and configured to selectively reflect or refract light incident from a first direction that intersects the first and second optical axes, and light incident from a second direction that intersects the first and second optical axes to the first lens module and the second lens module,
wherein the first direction is different from the second direction.

18. The camera module of claim 17, wherein the optical path changing mechanism is configured to move between a first position in which the light incident from the first direction is reflected or refracted toward the first lens module along the first optical axis and the light incident from the second direction is reflected or refracted toward the second lens module along the second optical axis, and a second position in which the light incident from the first direction is reflected or refracted toward the second lens module along the second optical axis and the light incident from the second direction is reflected or refracted toward the first lens module along the first optical axis.

19. The camera module of claim 18, further comprising a driving mechanism configured to rotate optical path changing mechanism between the first position and the second position with respect to a point at which either the first optical axis or the second optical axis intersects one of an axis corresponding to the first direction and an axis corresponding to the second direction.

20. The camera module of claim 17, where the first lens module has a narrower angle of view than the second lens module.

* * * * *